United States Patent
Moss

[11] Patent Number: 5,942,133
[45] Date of Patent: Aug. 24, 1999

[54] HOLDER FOR A CARBON ARC ELECTRODE

[76] Inventor: Paul B. Moss, P.O. Box 8407, Tulsa, Okla. 74101-8407

[21] Appl. No.: 08/955,709

[22] Filed: Oct. 23, 1997

[51] Int. Cl.$^6$ .................................................. B23K 9/013
[52] U.S. Cl. ............................................ 219/70; 219/69.1
[58] Field of Search ...................................... 219/69.1, 70

[56] References Cited

U.S. PATENT DOCUMENTS

| | | | |
|---|---|---|---|
| 3,387,111 | 6/1968 | Driscoll | 219/70 |
| 3,573,419 | 4/1971 | Henderson | 219/70 |
| 3,659,072 | 4/1972 | Carkhuff et al. | 219/70 |
| 3,735,085 | 5/1973 | McCall et al. | 219/70 |
| 4,045,649 | 8/1977 | Moss | 219/143 |
| 4,150,276 | 4/1979 | Moss | 219/70 |
| 4,317,024 | 2/1982 | Moss | 219/70 |
| 4,540,225 | 9/1985 | Johnson et al. | 219/70 |
| 4,761,531 | 8/1988 | Moss | 219/70 |
| 4,948,935 | 8/1990 | Moss | 219/70 |
| 4,973,809 | 11/1990 | Jenkins | 219/70 |

*Primary Examiner*—Geoffrey S. Evans
*Attorney, Agent, or Firm*—Head, Johnson and Kachigian

[57] ABSTRACT

An improved holder for a carbon arc electrode has a tubular handle that receives an electrical conductor and a hose for conducting air under pressure. An insulation block is affixed to the forward end of the tubular handle. A metal torch body extends from the insulation block in the direction opposite the handle and is in electrical communication with the electrical conductor. A flow passageway opening is provided within the body. An electrode support is affixed to the body and has a concave electrode contacting surface that is inclined at an angle to the torch body and has a lower surface having a gas passageway recess therein communicating with the torch body flow passageway. A U-shaped bail extends from the insulation block and has a bight portion positioned laterally above the electrode contacting surface. An insulation sleeve is received on the bight portion to engage an electrode positioned on the support by which the electrode is held in place so that a workman can establish an electrical arc with a metal work piece to melt away portions of the work piece, the molten metal being blown away by air passing through the handle and the electrode support air passageway.

15 Claims, 2 Drawing Sheets

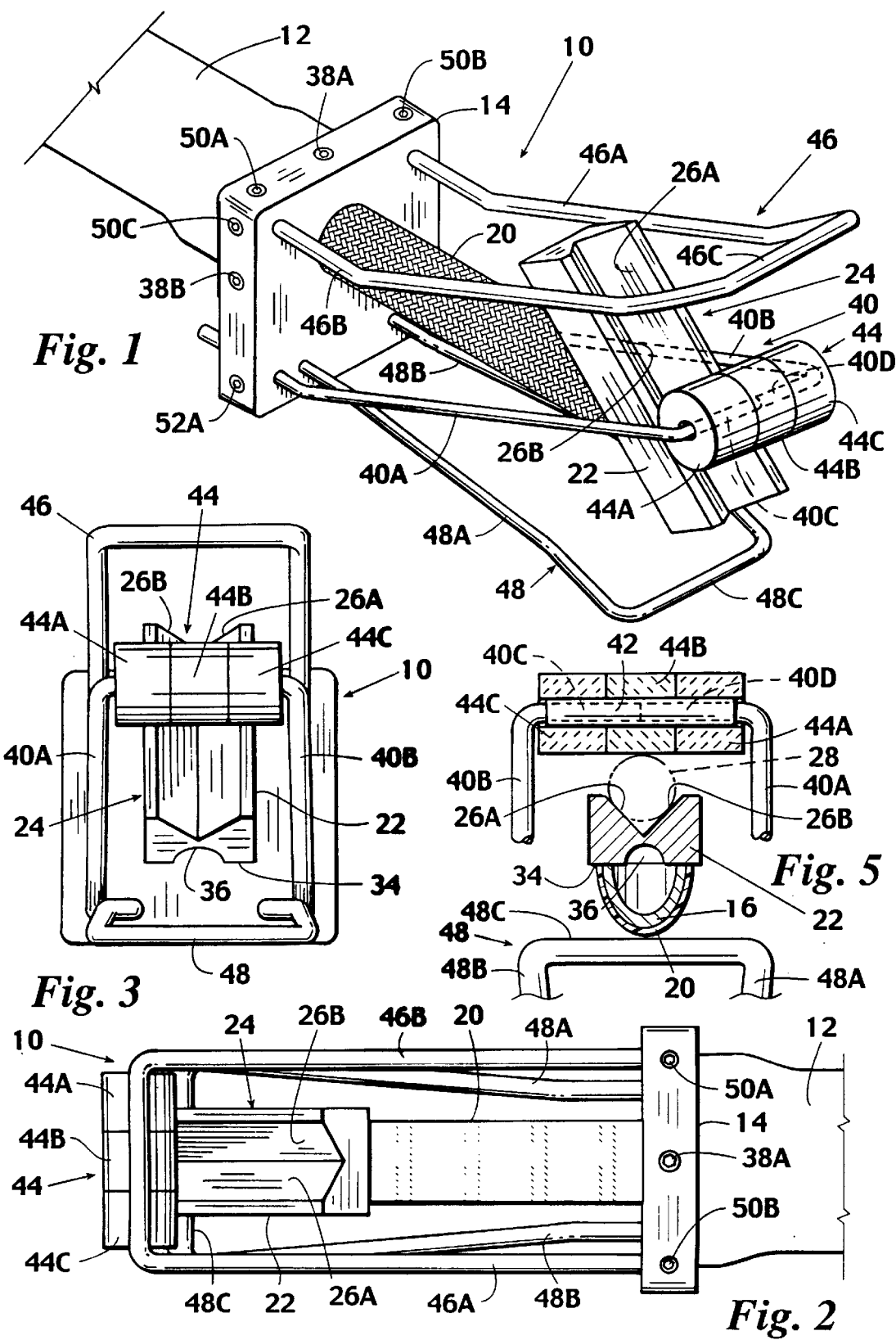

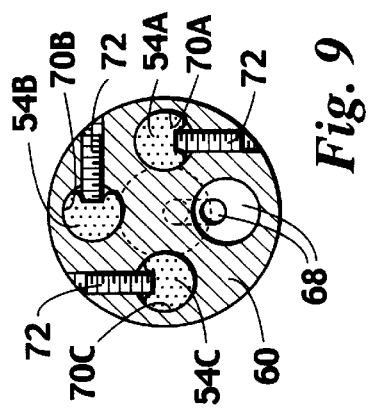
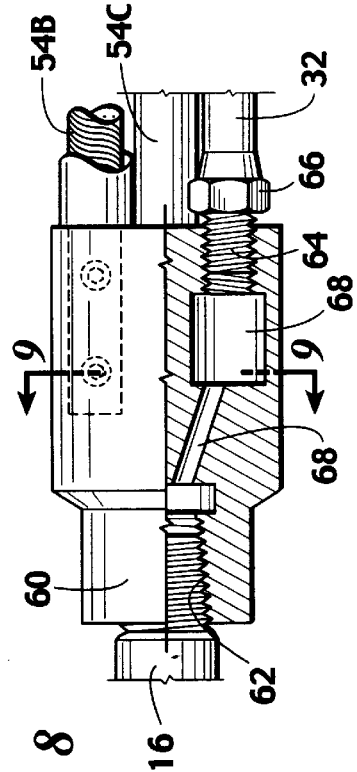
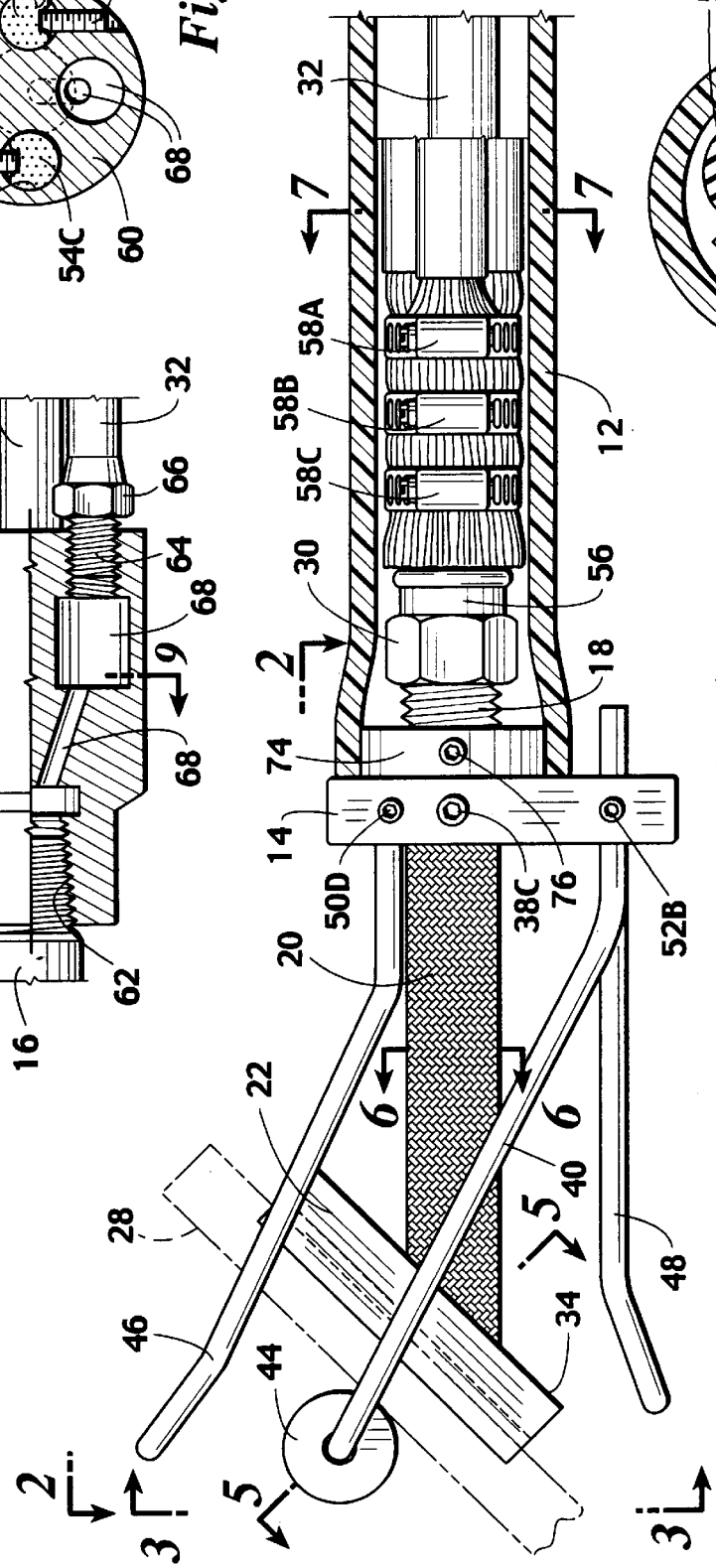
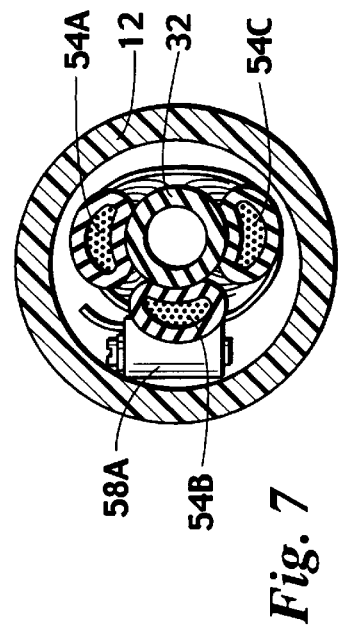
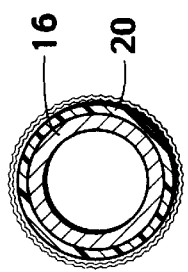

HOLDER FOR A CARBON ARC ELECTRODE

REFERENCE TO MICROFICHE APPENDIX

This application is not referenced in any microfiche appendix.

REFERENCE TO PENDING APPLICATIONS

This application is not related to any pending applications.

BACKGROUND OF THE INVENTION

A well known technique for cutting metal includes the use of a carbon arc electrode. A low voltage, high current source is applied between the work piece and the electrode. A workman positions the electrode to establish an arc between the electrode and the work piece. The arc creates substantial heat, melting away metal where the arc contacts the metal work piece creating molten metal. By use of a jet of air the molten metal is blown away to expose further unmolten metal making up the work piece so that metal can be removed from the work piece as the workman skillfully positions the electrode.

In order to effectively accomplish cutting metal using this technique, a holder is required to perform three basic functions. First, to hold a carbon arc electrode in a way so that it can be easily manipulated by a workman and wherein the length of the electrode extending from the holder can be easily adjusted. Second, to provide means of maintaining a low electrical resistant connection between the holder and electrode. Third, to direct air along the electrode to blow away molten metal formed in the cutting process. It is important that the holder be as light as possible and yet sturdy enough to support a carbon arc electrode in the harsh environments in which it is used.

For background information relating to holders for carbon arc electrodes, reference may be had to the following previously issued United States patents:

| U.S. PAT. NO. | INVENTOR | TITLE |
|---|---|---|
| 4,045,649 | Moss et al | Holder For Carbon Arc Electrodes |
| 4,150,276 | Moss | Holder For Air Carbon Arc Electrode |
| 4,761,531 | Moss | Torch With Improved Air Flow |
| 4,948,935 | Moss | Apparatus For Use With A Carbon Arc Torch To Retain Short Electrodes |

BRIEF SUMMARY OF THE INVENTION

An improved holder for a carbon arc electrode includes a tubular handle which is preferably made of tough, non-conductive material such as plastic or fiberglass. The tubular handle serves at least three basic purposes. First, as the name suggests, it forms a handle by which a workman grasps and manipulates the holder. Second, the tubular handle provides a passageway therethrough for receiving at least one electrical conductor but normally a plurality of electrically paralleled conductors by which electrical energy is supplied to a carbon arc electrode. Third, the handle provides an opening therethrough to receive a length tubing by which a source of air under pressure is supplied to the holder.

Affixed to a forward end of the tubular handle is an insulation block formed of a tough, electrically insulative material such as plastic, fiberglass or ceramics. The insulation block is preferably rectangular and has a flat forward and a rearward surface. A metal torch body extends from the insulation block in a direction opposite the handle and is formed of electrically conductive material, such as copper. In a preferred arrangement, the tubular body passes through an opening in the insulation block to extend both forwardly and rearwardly of the block forward and rearward surfaces. A portion of the torch body is received within the tubular handle and provides a structure for supporting the tubular handle to the insulation block. The torch body is connected to a hose by which air pressure is supplied to it. One or a plurality of electrical conductors are attached to the torch body so that it provides a means of extending electrical energy to a carbon arc electrode.

In a preferred arrangement, a specifically designed connector is provided that is generally cylindrical and has an internally threaded recess in the forward end thereof that engages a threaded rearward end of the torch body. In the rearward end of the connector is a threaded opening for receiving a coupling member of a hose by which a source of air is supplied to the connector, the connector having an internal passageway communicating with the torch body. Further, the connector has one or more recesses therein spaced from the air passageway, each recess serving to receive the end of an electrical conductor.

Affixed to the forward end of the torch tubular body is an electrode support that is in the form of an elongated electrically conductive member, made such as of copper. The support is integrally fixed to the forward end of the torch body at an acute angle and has an upper surface that is adapted to engage a carbon electrode. This upper surface is, in a plane normal to the length of the electrode support, of a generally trough-like configuration.

The forward portion of the electrode support has, in the bottom surface thereof, a semi-circular recess that communicates with the interior of the tubular torch body.

A U-shaped bail that has opposed flexible leg portions is affixed to and extends from the insulation block. The bail has a bight portion between the outer ends of the leg portions that extend laterally above the electrode support contacting surface. Positioned on the bail bight portion are a plurality of short length tubular ceramic sleeves. These ceramic sleeves contact a carbon electrode when positioned within the holder and force the carbon electrode into electrical contact with the trough-like upper surface of the electrode support.

To prevent inadvertent contact of the torch with a work piece which would cause current to flow between the conductive parts of the torch and the work piece, U-shaped bails are affixed to the insulation block positioned both above and below the torch tubular body and the electrode support.

The improved holder for a carbon arc electrode provides a system for holding a carbon arc electrode in a manner to enable a skill workman to carefully manipulate the electrode with respect to a work piece and in a way to effectively direct a stream of air to molten metal formed by an arc that is caused to exist between the end of a carbon arc electrode and the work piece to facilitate removal of molten metal from a work piece.

A better understanding of the invention will be obtained from the following description of the preferred embodiments, taken in conjunction with the attached drawings.

DESCRIPTION OF THE DRAWINGS

FIG. 1 is an isometric view of the forward portion of the improved holder for a carbon arc electrode.

FIG. 2 is a top plan view of the forward portion of the improved carbon arc electrode as shown in FIG. 1.

FIG. 3 is a front elevational view of the carbon arc electrode of FIG. 1.

FIG. 4 is an elevational cross-sectional view of the embodiment of the improved carbon arc electrode as shown in FIG. 1.

FIG. 5 is a partial cross-sectional view of the forward end portion of the improved carbon arc electrode holder as taken along the line 5—5 of FIG. 4 showing an outline of a carbon arc electrode as positioned within the holder.

FIG. 6 is a cross-sectional view taken along the line 6—6 of FIG. 4 showing insulation surrounding the tubular torch body.

FIG. 7 is a cross-sectional view of the handle portion of the holder as taken along the line 7—7 of FIG. 4 showing the embodiment in which a plurality of electrical conductors are secured by clamps to an extension of the torch body.

FIG. 8 is an elevational view, shown partially in cross-section, of a special connector for use within the tubular handle of the torch body as an alternate embodiment to the arrangement of FIG. 4. The improved connector is a unitary device, cylindrical in external shape, that is threadably positioned on the threaded inner end of the torch body and has provisions for receiving, in a threaded opening, the end of a flexible hose by which air under pressure is supplied through the connector to the torch body. The connector also has a plurality of openings which receive the ends of electrical conductors.

FIG. 9 is a cross-sectional view taken along the line 9—9 of FIG. 8 of the connector, showing three openings for receiving the inner ends of three electrical cables and illustrating set screws for retaining the electrical cables in continuity with the connector.

DETAILED DESCRIPTION OF THE PREFERRED EMBODIMENTS

Referring first to FIGS. 1 through 3, the basic elements of an improved holder for a carbon arc electrode are illustrated. The holder for a carbon arc electrode is indicated generally by the numeral 10. Holder 10 has a tubular handle 12, the forward end portion of the handle being shown in FIGS. 1 and 2. The tubular handle is preferably formed of tough insulating material, such as tough plastic or fiberglass, and is of length of approximately 9 to 11 inches to afford a comfortable and convenient hand hold for a user by which holder 10 is manipulated during the process of cutting away metal from a work piece. Supported at the outer end of handle 12, in a manner to be described subsequently, is an insulation block 14 that is generally rectangular with a flat forward and rearward surface. Insulation block 14 is formed of non-conductive material and may preferably be made out of tough rigid plastic. Extending from insulation block 14 is a tubular torch body 16 formed of highly electrically conductive material such as copper.

As shown in FIG. 4, the inward end of torch body 16 is provided with threads 18. The tubular torch body 16 is shown in cross-sectional view of FIG. 6. Received on the tubular exterior surface of torch body 16, as seen in FIGS. 1, 2, 4 and 6, is a sheeting of electrical insulation 20.

Affixed to the outer end of torch body 16 is an electrode support 22 that is elongated and has an upper surface generally indicated by the numeral 24 that is trough-like, that is, in cross-section, generally concave. The concavity of upper surface 24 increases the area of contact with an elongated cylindrical carbon electrode. Connector upper surface may, in cross-section, be semi-circular or, in the embodiment illustrated, concavity is obtained by intersecting planar surfaces 26A and 26B. In FIG. 5, the external cross-sectional shape of a carbon arc electrode is indicated by the dotted line 28. This figure shows how the concave surface 24, such as provided by intersecting planar surfaces 26A and 26B, securely receives a carbon arc electrode and holds it in alignment with elongated electrode support 22.

Torch body 16 is tubular, as has been previously described and as illustrated in the cross-sectional view of FIG. 6. In the illustrated arrangement as seen in the cross-sectional view of FIG. 4, the inner end of the torch body is provided with threads 18 that receive a coupling 30 that is secured to the inner end of tubing 32 by which a source of air under pressure is supplied to the torch. Compressed air provided through tubing 32, coupling 30 and the interior of torch body 16 is conveyed to electrode support 22 which has, in the forward portion of a lower surface 34, an elongated slot or groove 36 that, in the illustrated arrangement, as seen in FIGS. 3 and 5, is of semi-circular cross-sectional configuration. Groove 36 communicates with the interior of torch body 16 so that air under pressure is ejected out through grooves 36 in electrode support 22 to blow away molten metal formed by an arc that, in the use of the torch, is caused to exist between the end of a carbon arc electrode and a work piece. The relatively large diameter groove 36 allows for a high volume of air, depending upon the pressure of air applied to hose 32, to be discharged along the direction of a carbon electrode 28 as positioned within the torch.

FIG. 5 shows the tubular torch body 16 in angular cross-section and shows the communication provided between the interior of the tubular torch body and groove 36.

Insulation block 14 is preferably generally rectangular and is preferably formed of tough plastic material or tough multi-layered fiberglass, that is, a material that is relatively strong and an electrical insulator. Tubular torch body 16 extends through an opening in insulation block 14 and is secured to the insulation block by set screws, three of which, that is set screws 38A, 38B and 38C, being seen in FIGS. 1, 2 and 4. A similar set screw is positioned in the bottom edge of insulation block 14, although not seen in the drawings so that the tubular torch body is securely attached to insulation block 14 by four set screws. In this way insulation block 14 is easily attached to tubular torch body 16 and this arrangement makes it easy to employ torch body tube insulation sheathing 20 so that the only exposed part of the torch that is electrically charged is electrode support 22.

A U-shaped bail, generally indicated by the numeral 40, is affixed to the insulation block and is used to retain a carbon electrode in position within the upper surface 24 of electrode support 22. The U-shaped bail 40 includes a first leg 40A and a second leg 40B. The outer ends of legs 40A and 40B are bent at 90° angles to provide bight portions 40C and 40D that extend within the opposite ends of a small diameter metal tube 42 (See FIG. 5). The portions 40C and 40D of the U-shaped bail together with the metal tubes 42 form a bight portion of the U-shaped bail. Positioned on the bight portion or, specifically on metal tube 42, is an insulation sleeve generally indicated by the numeral 44 that, in the specific embodiment illustrated, includes three short length tubular ceramic members 44A, 44B and 44C. The tubular ceramic pieces provide insulation between U-shaped bail 40 and a carbon electrode 28 positioned within electrode support 22. By employing a plurality of short length ceramic members as illustrated, the carbon electrode is more securely retained in contact with electrode support 22 and breakage of the ceramic members is reduced.

To help guard against inadvertent contact of electrode support 24 with a work piece or any other grounded metallic object, the torch is provided with two guard bails, that is, a top guard bail 46 and a bottom guard bail 48. Top guard bail 46 is an integral member formed of a metal rod having a first leg 46A, a second leg 46B and a bight portion 46C. Top guard rail extends above and to either side of electrode support 22. The top rail is held to insulation block 14 by means of set screws 50A, 50B and 50C as seen in FIG. 1 and 50D as seen in FIG. 8. The bottom guard rail 48 has a first leg 48A, a second leg 48B and a bight portion 48C, each leg being held in position by two set screws, that is, a total of four set screws, only two (52A and 52B) being shown, the set screws in the bottom edge of the insulation block not being seen in the drawings. Thus, each of the bails 46 and 48 is held in position by four set screws. The bottom bail 48 extends below and to either side of electrode support 22. While the bails are preferably formed of metal rods, they are electrically insulated from any portion of the torch since they extend from insulation block 14.

Bail 40 is slightly upwardly deflected to permit a carbon electrode to be positioned between electrode support 24 and insulation element 44B, the flexure of bail 40 serving to apply force on the top of the carbon electrode.

The torch operates by the application of a low voltage high current electrical source that is conveyed by the torch to a carbon electrode in an electrical system in which one pole of the system is attached to a work piece (not seen in the drawings) and the other pole to the torch and thereby to the carbon electrode. One method of attaching electrical conductors to tubular torch body 16 is shown in FIGS. 4 and 7. As shown in the cross-sectional view of FIG. 7, three conductors 54A, 54B and 54C extend exteriorly of air supply hose 32. The copper conductive core of each of conductors 54A, 54B and 54C, is formed around a tubular copper pipe extension 56 that is attached to the threaded end 18 of the tubular torch body 16. Conductors 54A, 54B and 54C are secured to the exterior of tubular extension 56 by means of adjustable clamps 58A, 58B and 58C, the clamps each being a typical hose clamp. This method also allows the use of a smaller diameter handle when using less than three cables. The clamps can be brazed after tightening and then the threading mechanisms cut off so as to reduce the diameter of tubular handle 12. Air supply tubing 32 is attached to the rearward end of tubular extension 56 by a coupling that is not seen in the drawings.

Conductors 54A, 54B and 54C are all in parallel and connect at their opposite ends to the same voltage source. The use of multiple conductors is for the purpose only of improving the flexibility of the conductors that carry electrical energy to the torch. Instead of three conductors, only one may be employed with the one having the same current capacity as the three illustrated, however, it can be easily seen that a single conductor having the current carrying capacity of conductors 54A, 54B and 54C would be less flexible and therefore make the torch more cumbersome to operate.

An alternate embodiment providing connection for both air supply hose 32 and the electrical conductors is shown in FIGS. 8 and 9. These figures show a connector 60 having a threaded opening 62 in a forward end thereof that threadably receives the inner end of tubular torch body 16. The opposite end of the connector has a threaded opening 64 that receives a threaded male end of a coupling 66 by which air supply hose 32 is attached to the connector. Within the connector there is a passageway 68 that communicates air hose 32 to the interior of tubular torch body 16.

At the rearward end of connector 60 there are a plurality of recesses, three being shown, indicated by the numerals 70A, 70B and 70C, that receive conductors 54A, 54B and 54C, the conductors being held in place by set screws 72. A total of 6 set screws 72 are employed, three of which are seen in cross-sectional view of FIG. 9.

Connector 60 is contained within the interior of handle 12. That is, the connector is surrounded by a tough plastic tubular handle 24, the electrical conductors and the air hose entering the torch through the open rearward end (not seen) of handle 12. As seen in FIG. 4, in order to secure the forward end of tubular handle 12 to the torch, the forward end is internally expanded to extend around a collar 74 that is attached to tubular torch body 16 adjacent to the threaded end 18. Collar 74 is held in place by set screws 76, only one of which is seen in the drawings.

The improved holder for a carbon arc electrode as illustrated and described herein solves many of the practical problems with existing electrodes. It is economical to manufacture, simple to operate, sturdy, long lasting and easy to repair.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An improved holder for a carbon arc electrode comprising:

a tubular handle providing a passageway therein for receiving at least one electrical conductor and a hose for supplying a gas under pressure;

an insulation block affixed to a forward end of said tubular handle;

a metal torch body extending from said insulation block in a direction opposite said handle, being electrically conductive and in electrical communication with said electrical conductor and having a flow passageway opening therein;

a metal electrically conductive electrode support affixed to said torch body, the electrode support having a forward end, an upper electrode contacting surface that is inclined at an angle to said torch body and a lower surface having a gas passageway recess therein communicating between said torch body flow passageway and the electrode support forward end, the gas passageway having a shape in a plane normal to the length of said electrode and at said electrode support forward end that is semi-circular, providing a semi-circular gas discharge pattern;

a U-shaped bail having opposed flexible leg portions affixed to and extending from said insulation block, the bail having a bight portion between the leg portions that extends laterally above said electrode support contacting surface; and an insulation sleeve received on said bail bight portion, a carbon arc electrode being removably receivable between the insulation sleeve and said electrode support electrode contacting surface.

2. An improved holder for a carbon arc electrode according to claim 1 wherein said insulation sleeve is formed of a plurality of short length tubular ceramic pieces.

3. An improved holder for a carbon arc electrode according to claim 1 wherein said electrode support is elongated and wherein said electrode contacting surface is, in a cross-section normal to the electrode support length is of concave configuration to increase the surface area of contact with a cylindrical carbon arc electrode.

4. An improved holder for a carbon arc electrode according to claim 3 wherein said concave configuration of said electrode contacting surface includes intersecting planar surfaces meeting at an angle.

5. An improved holder for a carbon arc electrode according to claim 1 including:
   a connector received within said handle and affixed at one end to said tubular torch body and at an opposite end to said hose for supplying a gas under pressure and having therein an internal passageway connecting said tubular torch body with said supply of gas under pressure and having at the opposite end connection to said at least one electrical conductor.

6. An improved holder for a carbon arc electrode comprising:
   a tubular handle providing a passageway therein for receiving at least one electrical conductor and a hose for supplying a gas under pressure;
   an insulation block affixed to a forward end of said tubular handle;
   a metal torch body extending from said insulation block in a direction opposite said handle, being electrically conductive and in electrical communication with said electrical conductor and having a flow passageway opening therein;
   a metal electrically conductive electrode support affixed to said torch body, the electrode support having a forward end, an upper electrode contacting surface that is inclined at an angle to said torch body and a lower surface having a gas passageway recess therein communicating between said torch body flow passageway and the electrode support forward end;
   a U-shaped bail having opposed flexible leg portions affixed to and extending from said insulation block, the bail having a bight portion between the leg portions that extends laterally above said electrode support contacting surface; and
   a plurality of individual short length tubular ceramic pieces each directly rotatably received on said bail bight portion, a carbon arc electrode being removably receivable between at least one of said individual tubular ceramic pieces and said electrode support electrode contacting surface.

7. An improved holder for a carbon arc electrode according to claim 6 wherein said electrode support is elongated and wherein said electrode contacting surface is, in a cross-section normal to the electrode support length is of concave configuration to increase the surface area of contact with a cylindrical carbon arc electrode.

8. An improved holder for a carbon arc electrode according to claim 7 wherein said concave configuration of said electrode contacting surface includes intersecting planar surfaces meeting at an angle.

9. An improved holder for a carbon arc electrode according to claim 6 wherein said gas passageway recess in said electrode support is, at said forward end and in a plane normal to the length of said electrode support, semi-circular providing a semi-circular gas discharge pattern.

10. An improved holder for a carbon arc electrode according to claim 6 including:
   a connector received within said handle and affixed at one end to said tubular torch body and at an opposite end to a hose for supplying a gas under pressure and having therein an internal passageway connecting said tubular torch body with the hose for supplying a gas under pressure and having at the opposite end connection to said at least one electrical conductor.

11. An improved holder for a carbon arc electrode comprising:
   a tubular handle;
   an insulation block affixed to a forward end of said tubular handle;
   a metal torch body extending from said insulation block in a direction opposite said handle and having a flow passageway therein;
   a metal electrically conductive electrode support affixed to said torch body, the electrode support having a forward end, an upper electrode contacting surface that is inclined at an angle to said torch body and a lower surface having a gas passageway therein communicating between said torch body flow passageway and said electrode support forward end;
   a U-shaped bail having opposed flexible leg portions affixed to and extending from said insulation block, the bail having a bight portion between the leg portions that extends laterally above said electrode support contacting surface;
   an insulation sleeve received on said bail bight portion, a carbon arc electrode being removably receivable between the insulation sleeve and said electrode support electrode contacting surface;
   a connector received within said tubular handle and affixed at one end to said torch body and having therein an internal passageway connecting said torch body flow passageway with a hose for supplying gas under pressure that flows through said connector, through said torch body and is discharged through said electrode support gas passageway and
   a cable formed of a plurality of at least three paralleled insulated conductors extending from a voltage source, each conductor being separately connected to said connector within said tubular handle, said plurality of conductors providing a cable providing increased flexibility of use of the carbon arc electrode holder.

12. An improved holder for a carbon arc electrode according to claim 11 wherein said insulation sleeve is formed of a plurality of short length tubular ceramic pieces.

13. An improved holder for a carbon arc electrode according to claim 11 wherein said electrode support is elongated and wherein said electrode contacting surface is, in a cross-section normal to the electrode support length is of concave configuration to increase the surface area of contact with a cylindrical carbon arc electrode.

14. An improved holder for a carbon arc electrode according to claim 13 wherein said concave configuration of said electrode contacting surface includes intersecting planar surfaces meeting at an angle.

15. An improved holder for a carbon arc electrode according to claim 11 wherein said gas passageway recess in said electrode support is, at said forward end and in a plane normal to the length of said electrode support, semi-circular, providing a semicircular gas discharge pattern.

* * * * *